US009939868B2

(12) United States Patent
Shuster et al.

(10) Patent No.: US 9,939,868 B2
(45) Date of Patent: Apr. 10, 2018

(54) DEVICE POWER AND RESOURCE MANAGEMENT

(71) Applicants: Gary Stephen Shuster, Fresno, CA (US); David Goldsmith, Manilus, NY (US)

(72) Inventors: Gary Stephen Shuster, Fresno, CA (US); David Goldsmith, Manilus, NY (US)

( * ) Notice: Subject to any disclaimer, the term of this patent is extended or adjusted under 35 U.S.C. 154(b) by 0 days.

(21) Appl. No.: 14/710,524

(22) Filed: May 12, 2015

(65) Prior Publication Data

US 2015/0323974 A1 Nov. 12, 2015

Related U.S. Application Data

(60) Provisional application No. 61/992,196, filed on May 12, 2014.

(51) Int. Cl.
*G06F 1/32* (2006.01)
*G08B 21/18* (2006.01)
*H04M 1/725* (2006.01)
*H04W 52/02* (2009.01)

(52) U.S. Cl.
CPC ............... *G06F 1/32* (2013.01); *G06F 1/329* (2013.01); *G06F 1/3212* (2013.01); *G08B 21/182* (2013.01); *H04M 1/72563* (2013.01); *H04W 52/0277* (2013.01); *Y02B 60/50* (2013.01)

(58) Field of Classification Search
CPC .......... G06F 1/3212; G06F 1/329; G06F 1/32; G08B 21/182; G08B 21/18; H02J 7/00; H04M 1/72563; H04W 52/0277; Y02B 60/50

USPC .................................................. 320/132, 107
See application file for complete search history.

(56) References Cited

U.S. PATENT DOCUMENTS

| 7,669,236 | B2* | 2/2010 | Fiske ...................... G06F 21/32 713/184 |
| 8,655,307 | B1* | 2/2014 | Walker .............. H04W 52/0212 455/343.5 |
| 2006/0135217 | A1* | 6/2006 | Sung ...................... H02J 7/0044 455/573 |
| 2009/0191850 | A1* | 7/2009 | Cardwell, III ....... G08B 25/016 455/412.2 |

(Continued)

*Primary Examiner* — Nathaniel Pelton
*Assistant Examiner* — Dung V Bui
(74) *Attorney, Agent, or Firm* — Sherrie Flynn; Coleman & Horowitt LLP

(57) ABSTRACT

Systems, devices and methods for managing charging and power status for portable devices are disclosed. The systems, devices and methods of the present invention comprise determining existing battery level and charge status of a device, comparing the battery level and charge status with predicted battery usage of tasks associated with calendar events scheduled to take place before the next charge, and transmitting an alert to one or more devices when a threshold likelihood that the battery level will not be sufficient for the predicted battery usage is exceeded. The present invention advantageously displays available power based on time available for certain tasks, and manages device power and resources by modifying and/or transferring tasks from a device having a battery level below a threshold level to one or more other devices with a higher battery levels.

7 Claims, 9 Drawing Sheets

(56) References Cited

U.S. PATENT DOCUMENTS

| | | | | |
|---|---|---|---|---|
| 2010/0041333 A1* | 2/2010 | Ungari | ............... | H02J 7/00 |
| | | | | 455/41.2 |
| 2012/0324259 A1* | 12/2012 | Aasheim | ............ | G06F 1/3206 |
| | | | | 713/320 |
| 2013/0069661 A1* | 3/2013 | Rich | ............ | H01M 10/42 |
| | | | | 324/433 |
| 2014/0120961 A1* | 5/2014 | Buck | ............ | H04W 4/12 |
| | | | | 455/466 |
| 2015/0323974 A1* | 11/2015 | Shuster | ............ | G06F 1/3212 |
| | | | | 713/320 |

\* cited by examiner

DEVICE POWER AND RESOURCE MANAGEMENT

CROSS-REFERENCE TO RELATED APPLICATIONS

This application claims the benefit of U.S. Provisional Patent Application No. 61/992,196 filed May 12, 2014. The text and contents of that provisional patent application are hereby incorporated into this application as if fully set forth herein.

FIELD OF INVENTION

The subject disclosure generally relates to the field of management of power delivery and utilization in devices. Specifically, embodiments of the present invention relate to devices, systems and methods to determine battery level and charging status of a device, determine the likelihood that predicted usage will exceed likely battery level before the next charging event, and transmit alerts, modify tasks and/or put the device in a lower power mode.

DISCUSSION OF THE BACKGROUND

Managing power and resources for portable devices has been a vexing problem since the introduction of the wind-up mechanical watch. As portable devices have become increasingly integrated into personal and business behavior, and as battery powered devices become ever more critical for non-computing tasks such as driving a battery-powered vehicle, the consequences of running out of portable device power have become quite severe. While there has been progress in managing power already present in portable devices (for example, U.S. Pat. No. 7,779,280 issued to one of the inventors herein), getting power to those portable devices remains a relatively primitive process. The mechanisms for physically delivering the power have changed over time, and now include such things as inductive charging and standardized charging interfaces (such as USB). However, other aspects of charging remain lacking.

It is a relatively common experience to find a portable device has insufficient power for the events planned prior to the next opportunity to charge the device. Frequently, a device fails to fully charge and the user is not aware of the failure until immediately prior to departure—and until after the opportunity to properly charge the device has passed.

Typically, devices provide an indication that they are charging (for example, by showing a "lightning" style icon next to a representation of a battery). Devices may also warn that they are in a low charge state by beeping or displaying a warning. However, these functions do nothing to avoid the most common problems with power status: A failed charge or a charge insufficient to power the device through the events planned prior to the next charging opportunity.

Consequently, there is a significant need for devices, systems and methods that provide an indication of a failed charge or a charge insufficient to power the device through tasks predicted as necessary prior to the next charging opportunity, and thereby allow for modification and/or prioritization of tasks, lower power consumption options and/or allow the transfer of tasks to devices with a higher charge level.

SUMMARY OF THE INVENTION

The present disclosure presents methods, systems and devices for managing charging and power status for portable devices.

In one aspect, the instant invention may include a wall charger configured to provide an audible, visible, and/or other alert in the event that the charger and/or device the charger is connected to ceases charging. In one implementation, the alert may occur if charging ceases other than at the request of the device. For example, if the charger falls out of the wall socket, charging would cease abruptly. In such a case, the device and/or the charger may deploy an alert.

In another aspect of the present invention, a system for transmitting alerts to a variety of devices is disclosed. Such alerts may be transmitted and simultaneously displayed on all devices, may be displayed in sequence on various devices until the alert is acknowledged, or may displayed based on a prorogation protocol and/or priority order. In some aspects of the invention, the charge level, status, current usage rate, etc., for a plurality of devices are displayed on one or more devices so that a user may, for example, pull up his desktop computer and see that his phone is charged to 72%, his laptop to 45% and his camera batteries are each charged to 81%, prior to leaving home without the necessity for an alert. Thus, in some instances the data display and certain other aspects of the inventions may be informative, regardless of whether they are predictive.

In a further aspect, the systems, methods and devices of the present invention may use predictive charging by utilizing various factors to determine whether a device should be charging. Such factors may comprise location of the device, proximity to known networks, proximity to known devices, past usage history, day of the week, time of day, analysis of the user's calendar, etc.

In yet another aspect, the present invention may flag unusual usage, diminishing battery life, temperatures, power required to connect via the predicted connection modalities (e.g., 3G weak signal takes lots more power than Wi-Fi strong signal), etc. In a further aspect, the present invention may use signal strength maps, history of signal strengths, or other phones for power usage information at the location.

In some embodiments, devices may share a single device's data connection (which could include data, SMS, voice, GPS, and/or other data) so the device with the most battery power is the only one with a live wide area connection, and other devices may connect to that first device via a lower power Bluetooth or peer to peer Wi-Fi. In some instances, the connection may be made over a connection capable of wide area networking, such as a Wi-Fi connection. In some aspects, a single charger outlet may charge devices in sequence.

Internet connectivity for various devices is becoming ubiquitous, and an environment where many devices are connected is sometimes referred to as the "Internet of Things". In some embodiments, as people use connected devices in the Internet of Things, their use is recorded in one or more databases so that in the future, the use may be known to all other connected devices For example, it may be advantageous for Gary to know that David carries a charger for a Samsung Galaxy S6, and Leslie has a battery that may be used for a quick charge. In other embodiments, devices may be detected via a network connection or may announce themselves, such as a charger that indicates it is available for charging a device.

Embodiments of the present invention may also charge to the needed level optionally plus N % margin of error before charging next device. When charging from a portable battery, the devices, systems and methods of the present invention may intelligently divide a charge between connected devices. In another aspect, charge may be advantageously directed to the device most capable of taking the charge at a full rate of charging.

These and other advantages of the present invention will become readily apparent from the detailed description below.

BRIEF DESCRIPTION OF THE DRAWINGS

Various non-limiting embodiments are further described with reference to the accompanying drawings in which.

DETAILED DESCRIPTION

Figure 1:
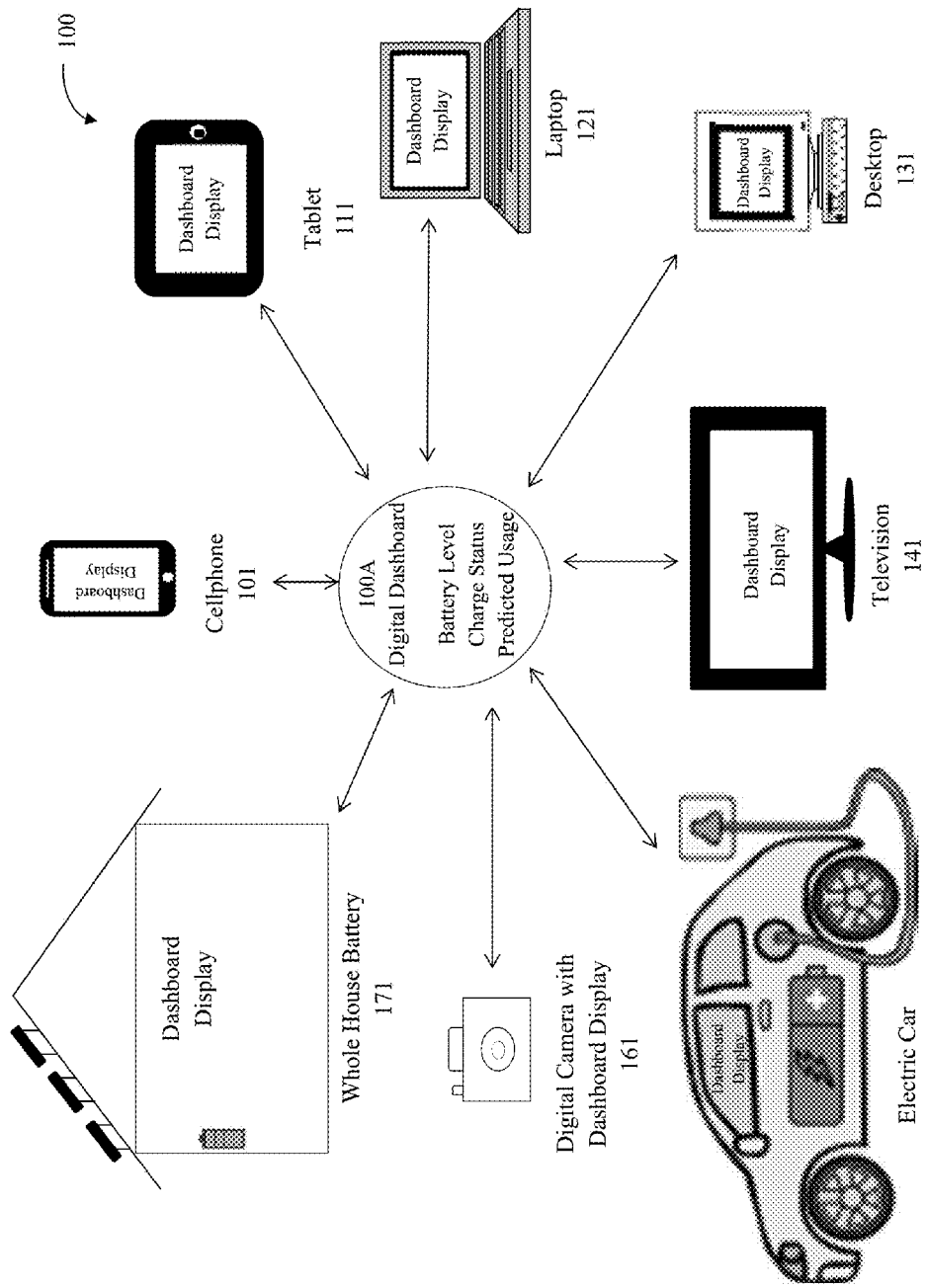
FIG. 1 schematically illustrates receiving and transmitting battery level, charging status and predicted usage to various devices, according to an embodiment of the present invention.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications, and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures and components have not been described in detail so as not to unnecessarily obscure aspects of the present invention. These conventions are intended to make this document more easily understood by those practicing or improving on the inventions, and it should be appreciated that the level of detail provided should not be interpreted as an indication as to whether such instances, methods, procedures or components are known in the art, novel, or obvious.

As discussed in the background, the present disclosure presents methods, systems and devices for managing charging and power status for portable and other devices.

The instant invention describes, among other things, innovative mechanisms for addressing failure to charge. It should be understood when used herein that a failure to charge may relate to a failure in the battery, depletion of the ability of a battery to hold a charge, insufficient or absent power coming from the grid, wall outlet, or charger, a broken or frayed cable, or other causes. It should be understood that while this document references electrical power from wall outlets, aspects of the invention may be utilized with other power sources, such as fuel cells, inductive charge, large batteries utilized to charge other batteries, and peer-to-peer charge transfer between devices. Furthermore, while this document references "portable devices", it should be understood that aspects of the inventions herein may apply to a variety of devices capable of storing power, including non-mobile battery powered devices and wall-connected devices with battery backup.

In one aspect, the instant invention may include a wall charger (which may include a transformer that converts alternating current to direct current). Said wall charger may integrate a communications feature whereby it can communicate with the device being charged (which communication may be simple, as in detecting that charge is being sent to a device, or complex, as in exchanging data about the amount of charge in the device, the maximum possible charge, and/or the amount of charge required). In another aspect, the device may detect that it is receiving a charge. The combination of device and charger may be configured in such a manner that the device can send power to the charger. The charger may be configured in such a manner that it retains some amount of charge, whether in a battery, a capacitor, a fuel cell, or otherwise even if disconnected from the wall outlet and/or the device. It should be understood that the charger need not literally plug into a wall, and can take other forms, such as a portable battery pack, a solar power unit, a fuel cell, or other form.

The charger may be configured to provide an audible, visible, or other alert in the event that it ceases charging. In one implementation, the alert may occur if charging ceases other than at the request of the device. For example, if the charger falls out of the wall socket, charging would cease abruptly. In such a case, the device and/or the charger may deploy an alert and/or display on one or more devices (e.g., via a digital dashboard on the user's device and/or another person's device) that the user's device is not charging. Such display on another person's device (e.g., the device of a husband of the user) may inform a person that, while the charge on the user's device is not low enough to trigger an alert, it may be of concern. For example, if a woman is out with friends, has her phone in her purse, and has only a 30% charge, her husband may notify her that she should charge her device as soon as she is able to do so, or she may risk running out of power on the device before the evening is over. It should thus be understood that an "alert" may take the form of a signal intended to get the attention of a person (i.e. a "push" type of alert), but in some embodiments may also take the form of updating a display or meter such as that shown in FIG. 8.

The presence of a human hand or human skin may also be detected by the device and/or the charger as a trigger for an alert. For example, if a human removes a charger from a wall socket, the electrical (or other) characteristics of human skin may be detected and, if detected, an alert signal may be triggered or disabled. In another aspect, the presence of a human hand may be utilized to disable an alert, so that, for example, an alert may be transmitted if the charge is interrupted unless the charger detects that a human hand has removed the charger. Such detection may be done on the charger, cable, device, or a combination thereof.

In another aspect, the accelerometer or other motion or attitude detection devices in the device may be utilized to trigger an alert. For example, if the charging is discontinued and the accelerometer or other motion or attitude detection devices do not indicate movement of the device (and/or the charger) within N seconds, an alert may be triggered or disabled. In another aspect, GPS data showing motion and/or a connection (such as Bluetooth) to a vehicle may be utilized as a signal to disable or change thresholds for motion or attitude detection.

It is relatively common for devices to be charged prior to the existing charge being fully depleted. A device may be programmed, whether expressly, based on past usage patterns, such as the timing or place or charge, or otherwise, with data that indicates conditions under which the device should be charging and/or should hold a charge exceeding a certain level. For example, Jane may plug her iPhone in on her nightstand to charge every night. If Jane's iPhone determines it is on her nightstand and/or that it is between 1 a.m. and 6 a.m., and it is not charging (and, optionally, that it holds a power level lower than a certain threshold), it may trigger an alert signal. Movement of the device may also be utilized, so that, for example, the alert is triggered if the iPhone is not being charged after five minutes of inactivity between 11 p.m. and 7 a.m. In some aspects, if Jane knows that she was going out dancing all night and charged her phone to 100% by 7 p.m., the device may recognize, and/or Jane may manually input, this change from her normal routine of charging her phone while sleeping. Additionally, that her phone is not on her nightstand and/or has changed locations and/or is being moved (as indicated by sensors such as GPS or accelerometer) may also indicate that the phone will not be charged at the normal time, and thus, no alert would be sent.

It should be noted that there are many devices capable of delivering an alert signal and which may be used in conjunction herewith, and the signal may take the form of audio, video, vibration, or other means (and the term "displayed", when used in conjunction with "alert", should be understood to include each of these modalities). It should also be noted that while embodiments of the present invention are capable of delivering alerts to multiple devices, preferred embodiments, include a digital display comprising battery level, charge status, predictive usage/charging for multiple devices, and in some instances, for devices for multiple users.

Referring now to FIG. 1, therein is shown a schematic illustration of system 100 comprising digital dashboard 100A, which may display relevant information regarding battery level and/or charging status for various devices, according to an embodiment of the present invention. The system 100 comprises a cellphone 101, a tablet 111 (e.g., an IPad, Samsung Galaxy Tablet, Android Tablet, etc.), a laptop computer 121, a desktop computer 131, a television 141, an electric car 151, a digital camera 161 and a whole house battery 171. Although the embodiment of FIG. 1 shows only these devices, any number of other devices utilizing stored power, a battery, a capacitor and/or a display (e.g., GPS navigation devices, sport watches, power tools, smart watches, security systems, fire alarm systems, battery operated medical devices, etc.), or multiple cellphones, tablets, laptop computers, etc. may be included. Devices shown in the digital dashboard 100A may include the user's devices as well as devices for other persons for whom the user was given appropriate permissions (e.g., a spouse, children, parent, friends, co-workers, etc.) In preferred aspects, the digital dashboard 100A may also display predicted usage for devices prior to the next charging opportunity. In some aspects, the display information of digital dashboard 100A may also be shown in a dashboard display on each of the devices 101, 111, 121 . . . 171 having digital display capabilities. It should be appreciated that a digital display may not be physically connected to the device, and in fact may be the display of another device. For example, a properly configured fire alarm may be able to transmit an image over a local area network and display via Apple's AirPlay protocol or Google's Chromecast protocol.

Figure 1A:
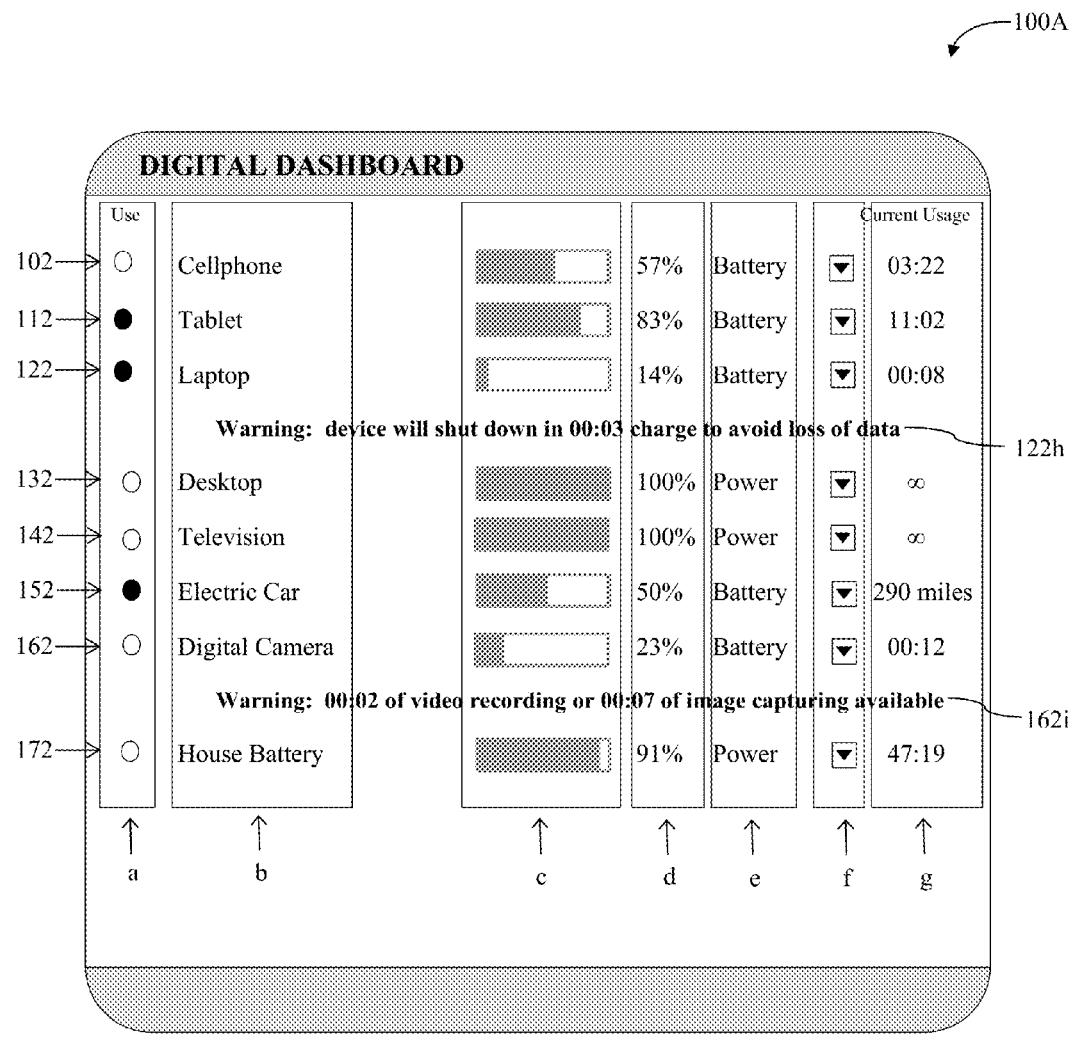
FIG. 1A shows a dashboard display of charge status and current usage for the devices of FIG. 1, according to an embodiment of the present invention.
Figure 8:
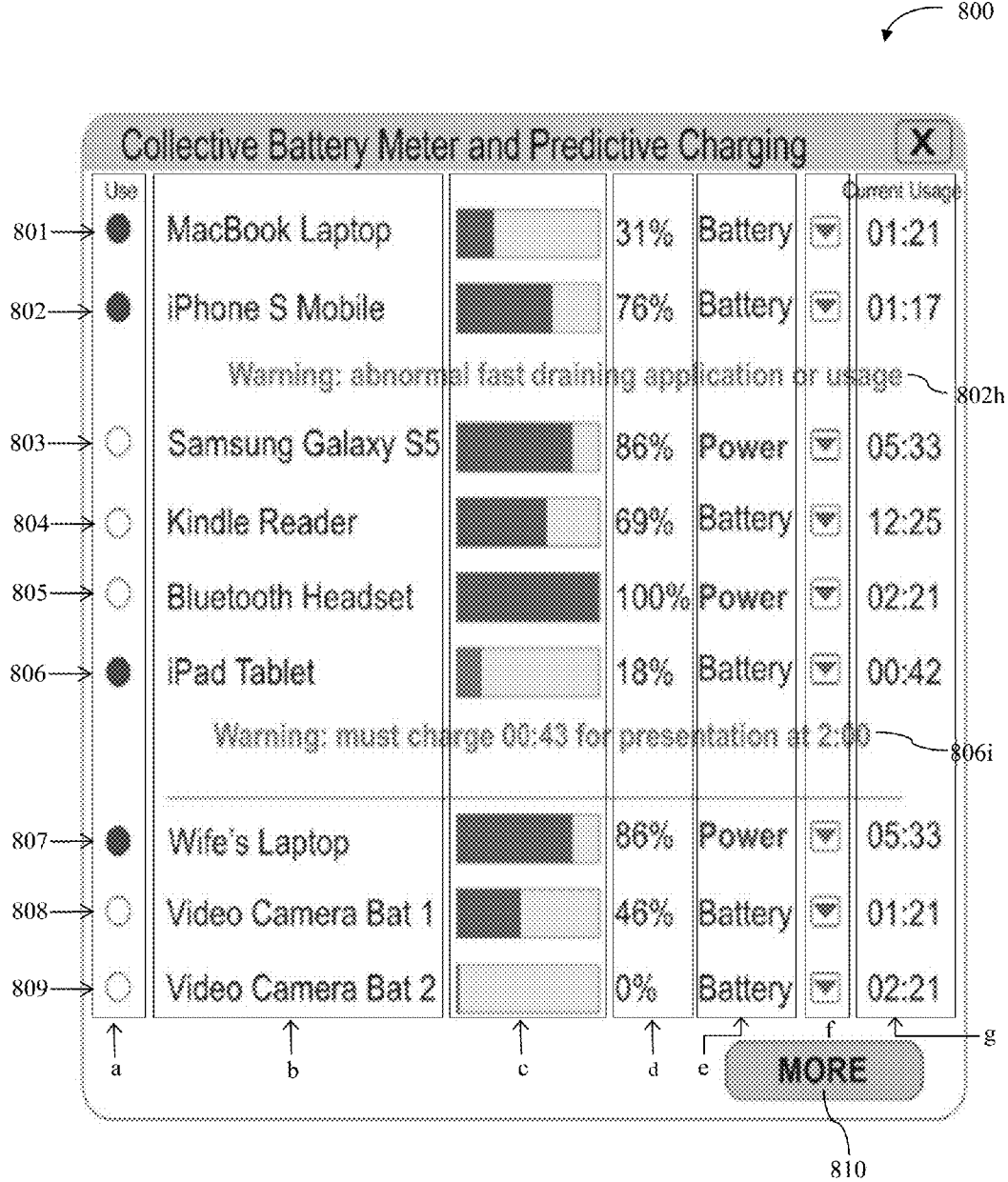
FIG. 8 shows a dashboard display of charge status and current usage for multiple devices, according to an embodiment of the present invention.

Referring now to FIG. 1A, digital dashboard 100A may display information regarding each of the devices 101, 111, 121 . . . 171, comprising whether the device is in use 102a, 112a, 122a . . . 172a, the device name 102b, 112b, 122b . . . 172b, a graphic depiction of the charging status 102c, 112c, 122c . . . 172c, a percentage of charge remaining 102d, 112d, 122d . . . 172d, an indication of whether the device is on battery or electrical power 102e, 112e, 122e . . . 172e, a pull-down menu for more information 102f, 112f, 122f . . . 172f, and current usage 102g, 112g, 122g . . . 172g (see also, digital dashboard 800 of FIG. 8). Abnormal usage may be indicated (e.g., 122h). Similarly, power requirements for known or predicted future needs may be displayed (e.g., a warning that a device must be charged for a presentation 162i).

Referring again to FIG. 1, in one aspect, alerts may be transmitted to one or more of the devices 101, 111, 121 . . . 171 based, for example, on when past usage indicates the device should be charging, but is not, or when predicted usage is likely to exceed battery level before the next charge. In some aspects the alerts may simultaneously be displayed on all devices (e.g., cellphone 101, tablet 111, laptop 121, desktop computer 131, television 141, etc.).

In another, the alerts may be displayed in sequence on various devices until the user acknowledges the alert (for example, first on the cellphone 101, then the tablet 111, then the laptop 121, then on the desktop computer 131, then the television 141, and onward until the user acknowledges the alert on one of the devices). Such alerts may also be transmitted (with proper permissions) to one or more other users' devices, and may notify the other user(s) if the alert has not been responded to by the user of the subject device within a preset time. In one embodiment, only devices responding to a query as "available" are included in the notification system. In another aspect, the alerts may be sent to devices in a priority order that may be set manually, set algorithmically, and/or set according to usage (e.g., devices being interacted with are alerted first) and/or proximity to the user. In one implementation, the alerts may be displayed on devices that are proximate to the user and/or the user's device that is being monitoring for charging status, even if the devices displaying the alerts do not belong to the user. For example, an alert propagation protocol may be utilized whereby an alert is displayed on televisions that are proximate to the user's device. In another aspect, the devices to which alerts may be sent may be ordered by current usage, so that devices in use may preferentially receive alerts and/or devices being used for certain functions, such as an active phone call, may not receive alerts and/or may receive alerts less preferentially and/or may receive alerts that do not interfere with the existing device use, such as a flashing light (or LED) if the device is being used for a phone call.

In some implementations, the alert propagation protocol may also utilize nearby devices that are not owned or operated by the user, in some aspects including those that are unknown or new to the user. The level of urgency needed to trigger an alert relating to a third party's power situation may be set by the user of the devices that would display the alert. For example, if Amy's cellular phone is at 10% charge and is plugged into a wall outlet, but the wall outlet loses power, it may send an alert to Bill's tablet. In one aspect, the alert signal may also bear information allowing the receiving device to evaluate the request, such as by transmitting current power level, predicted power requirements prior to the next charging opportunity, membership in a payments system whereby a payment may be triggered in exchange for displaying the message, or other information. However, while Amy may set her cellular phone to alert when dropping below 50%, Bill's threshold for honoring an alert request may be set more strictly and thus not permit the alert. These thresholds may be communicated between devices, and/or the actual display of an alert and/or failure to display an alert may be communicated to the originating device, allowing that device to determine the next course of action. In one aspect, alerts may be propagated only through devices that are part of the network and thus available to both send and receive alerts.

In one aspect, the transmission of a signal indicating an alert may take the form of the absence of a signal. For example, David's laptop may be set to send a signal when it starts charging, and to then transmit a signal at a certain interval. In some aspects, the signal may include data such as the current charge level and/or charge rate. If another device picks up the "start charging" signal and then does not detect the "still charging" signal (and/or does not detect a "done charging" or "intentionally unplugged" signal), the other device may then interpret the absence of a signal as a request to provide an alert that charging may have stopped. Such an implementation may be utilized generally, or may be reserved for situations where the device being charged is at risk of having insufficient power to send a signal indicating that charging has stopped (for example, a tablet with 1% remaining charge would be at risk of losing all charge if the attempt to charge it fails). In another aspect, signals that a device normally sends, such as a Wi-Fi connection or a return of a "ping" over a network, may be utilized.

In addition to items that are used daily or nearly daily, there are devices that are used infrequently such that the user may not recall the charge status of the battery and/or the battery may lose a material amount of charge between uses. Such items may utilize rechargeable and/or non-rechargeable batteries. In some cases, users leave the devices connected to a charger full time in order to make sure that the device has enough power when needed. However, in most such instances, less than 100% power is sufficient, so a full charge is not necessary. One problem with leaving devices connected to a charger full time is that the charger constantly utilizes power, leading to additional costs to the user and negative impacts on the environment. This is a "vampire power" problem that differs slightly from the more traditional concept of "vampire power" usage, where an AC/DC converter is left connected to a wall and constantly draws power. This system may be utilized, in some aspects, to control the charge level of devices and allow the converters and/or the devices to be turned off or temporarily turned off when the charge level is adequate for the predicted needs.

In one aspect, and as an example, consider a digital camera with two batteries, one battery installed in the camera (the "installed battery") and one left in the camera bag (the "spare battery"). The spare battery is in one of three states: (i) it is new to the user, meaning that neither the user nor the user's devices have measured the amount of charge it currently holds; (ii) it has been utilized and removed from the camera without being charged; or (iii) it has been charged in the camera or in a charging station.

A battery that is new to the user would be marked by the system as unknown charge status. A battery that has been utilized and removed without being charged would be marked as potentially depleted. In such a case, the user may update the data if the user charges the battery. A battery that has been charged in the camera or in a charging station would be marked as in a known charge state.

The rate of battery discharge may be included in what is displayed, in some aspects including the display of a range. For example, if a certain digital camera with a built-in battery is known to discharge when not in use at a rate of 1% per day at room temperature, but more rapidly in high temperatures, if the storage temperature is known, the discharge rate may be corrected to be more accurate. In addition, or alternatively, a range may be shown indicating that the battery was charged to 100% but was not used for N days and the system is confident to within X confidence interval that the device has therefore discharged between 15% and 25% of its capacity.

Rates of battery discharge may also be impacted by settings within a device. For example, the Canon 6D camera has a built-in GPS. However, if the GPS setting is not manually deactivated when shooting is complete, the GPS continues to drain battery power even if the camera is (apparently) fully powered down. In one aspect, a battery may have a built-in mechanism to detect and report such power drain. In another aspect, a device may be utilized to measure power flow from the battery (for example, a device with leads placed between the battery terminals and the power receiving terminals on the device). When idle flow is excessive, a warning may be sent. In particular where there are devices with known power use defects (such as the one described for the Canon 6D), the device may measure power flow to identify whether the flow rate is consistent with the defect, and if so, may warn the operator as to what is likely causing the power drain.

In addition, where multiple passive or inactive battery consumption rates are possible (such as with the Canon 6D with the GPS issue described above), the Digital Dashboard 100A or other display modality may provide multiple readings and/or a range of readings in predicting the battery remaining. For example, the Canon 6D may be listed as "20% to 90%", with 20% representing the predicted remaining battery with the GPS active and 90% with the GPS inactive.

The system may indicate the date of last charge, the amount of charge, and the likely discharge. In addition, past usage patterns or past experience may be incorporated in the data utilized and/or displayed (for example, 20% of the time the battery is unexpectedly low, corresponding to a friend's habit of pulling the battery out of the user's camera, using it in his own camera, and then placing it back in the original camera). In some aspects, declining battery capacity over time and/or other battery characteristics may be utilized to further refine the system.

For the sake of clarity, and without limiting the scope of the invention, we may refer to aspects of the invention as "predictive charging". A warning that the device is not charging despite being in a state where predictive charging would indicate that it should be charging may be referenced as a "predictive charging warning". Predictive charging may utilize various factors to determine whether a device should be charging.

Figure 2:
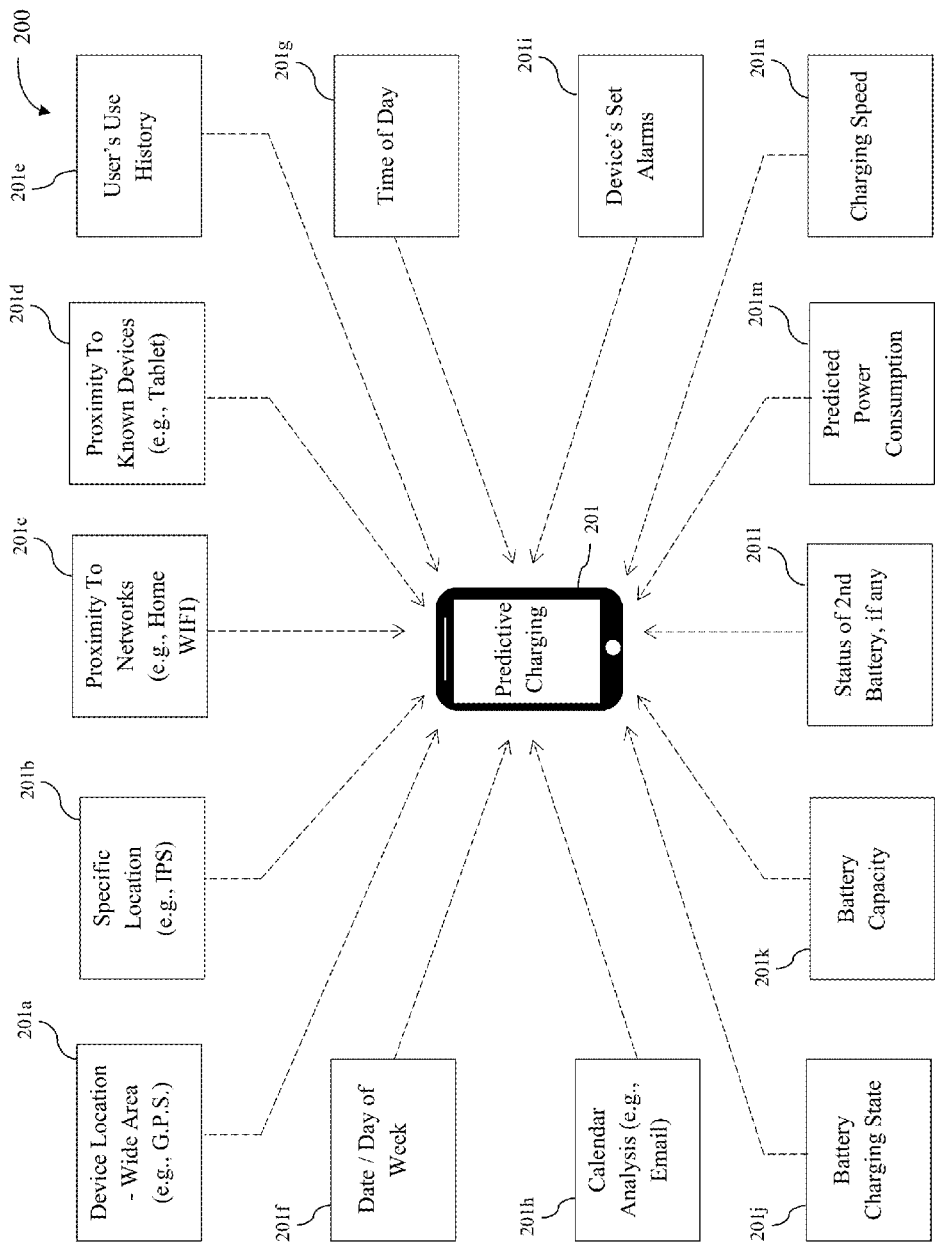
FIG. 2 schematically illustrates predictive charging, comprising various factors to determine whether a device should be charging, according to an embodiment of the present invention.

Referring now to FIG. 2, therein is shown a graphic illustration of predictive charging for a device 201. Although the device in FIG. 2 is depicted as a cellphone, the device may be any device having a display and/or a battery (e.g. a tablet, laptop desktop computer, television, smart watch, electric car, etc.). Predictive charging of the device 201 may comprise: (a) location of device in a wide-area sense 201a (e.g., location as determined by GPS, cell tower triangulation, Wi-Fi proximity, or other mechanisms that identify location with precision that allows determination as to the general location of a device such as "house", "office", "car", etc.); (b) location of device with specificity 201b (e.g., location as determined by indoor positioning systems ("IPS"), micro mapping, analysis of images or sounds, or other mechanisms to determine specific location of a device within a general location such as "bedroom night stand"); (c) proximity to known networks 201c (e.g., if the device is connected via 802.11 n connection to "Joe Home WiFi"); (d) proximity to known devices 201d (e.g., if the device is proximate to a user's Bluetooth device, if the device is an iPhone and it is next to the user's iPad, if the device is proximate to a Nest thermostat, if the device is proximate to a known charger, etc.); (e) amount of use 201e wherein a user's past usage history may be utilized to determine likely future power utilization; (f) day of the week 201f; (g) time of day 210g; (h) analysis of calendar for the next day or other time period, which may, in some aspects, include analysis of email, social media, calendars of third parties, and other sources from which likely activities of the device user may be predicted 201h; (i) time for which an alarm is set on the device 201i (e.g., the device has an alarm set for 5:00 a.m., which allows the device to infer that charging may be discontinued at or slightly after the time the alarm goes off); (j) battery charge state 201j; (k) battery capacity 201k; and (l) whether a secondary battery is available and/or has recently been charged 201l (e.g., if a device has a removable battery and the device is used to charge a battery and then a depleted battery is immediately inserted and charged to 25%, the device may infer that the user has available a charged replacement battery; similarly, if the device is always "topped-off" during the day utilizing an 800 mAh portable charger, the device may infer that it's power needs will be met if internal power plus 800 mAh of power are sufficient); (m) the predicted power consumption requirements 201m and/or (n) charging speed 201n associated with actual or predicted conditions at one or more predicted or current locations.

Predicted power consumption and/or charging speed may vary because certain network connections are far more power-intensive than other connections. For example, a very weak 3G signal may require that the device consume a high amount of power to maintain a strong connection, while a very strong Wi-Fi signal may maintain a connection with a relatively low amount of power consumption. Similarly, ambient temperature may impact battery efficiency in both utilization and charging.

Utilizing one or more of these factors, predictive charging warnings may be issued. In a simple example utilizing time of day only, if a user plugs in an iPhone right before bed, the iPhone may be plugged in 95% of the time by 11:30 p.m. and 99% of the time by midnight. If a threshold charging likelihood is exceeded and the device is not being charged (for example, when the 99% threshold is passed at midnight), the device may alert the user with a predictive charging warning, indicating that the device should be charging, but is not.

In some cases, devices are not charged in a location where a warning may be noticed. For example, if a person always charges her laptop at her home office desk, no amount of noise from the laptop's speaker may be sufficient to alert her once she is in the bedroom. In one aspect, the inventions may incorporate communication between devices in order to communicate predictive charging warnings and other charging data.

For the sake of clarity, and without limiting the scope of the inventions, we may refer to aspects of the invention as "calendar-based charging". As described in U.S. patent application Ser. No. 14/032,621 ("Situational and Global Context Aware Calendar, Communications, and Relationship Management"), it is possible to predict activity utilizing a calendar, past history, social media, and other indicia. When we reference a calendar or calendar-based charging, it should be understood to include the use of a user's calendar, but may also incorporate additional sources of activity prediction, such as communications on social media sites (e.g., Facebook, Twitter, Instagram, etc.). For example, Gary's Facebook page may link to an invitation for a dinner party that night, for which Gary accepts by tweeting his acceptance from the beach.

Figure 3:
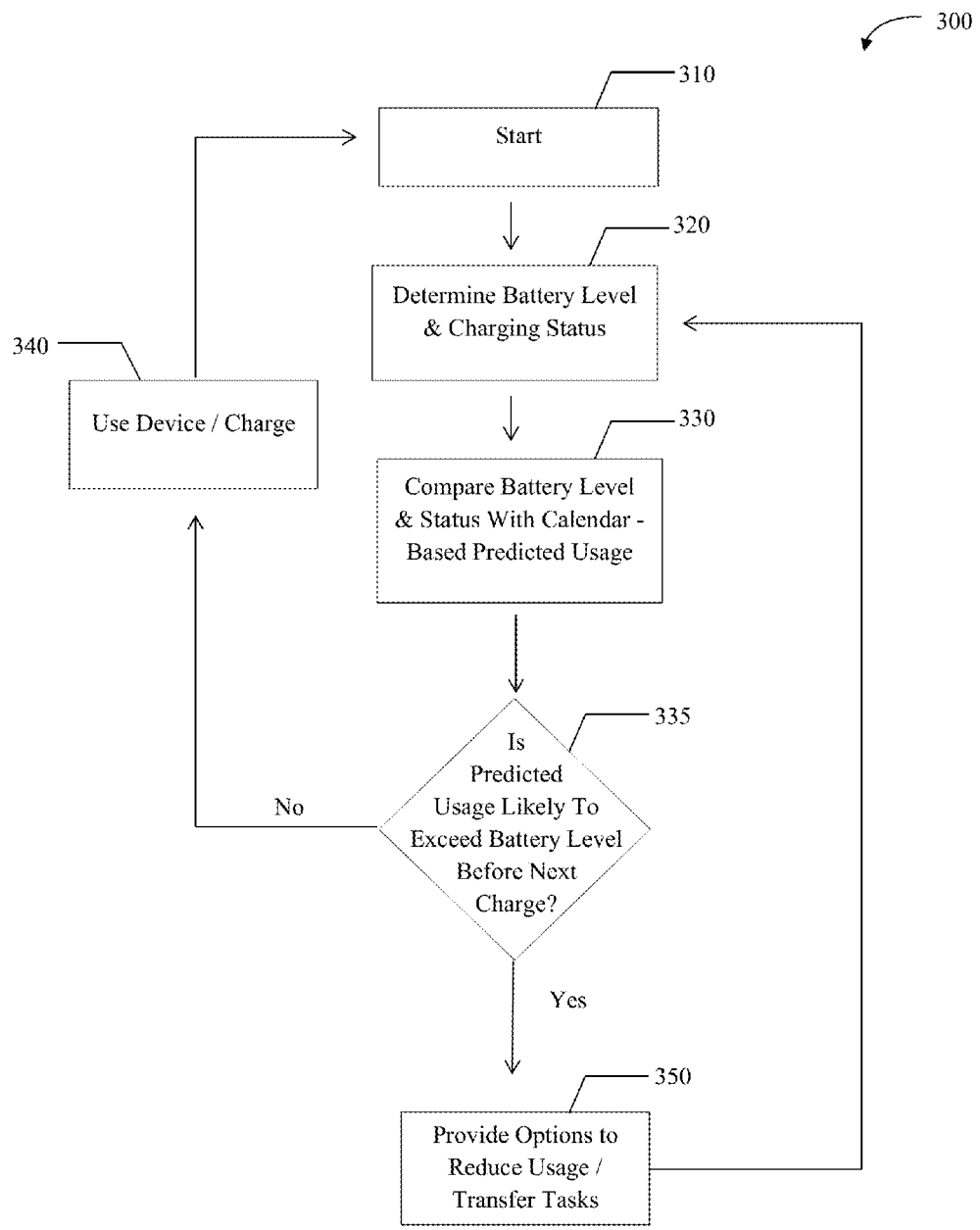
FIG. 3 is a flow chart for a method of providing options to reduce usage and/or transfer tasks based on calendar-based predicted usage, according to an embodiment of the present invention.

Referring now to FIG. 3, therein is shown a flow chart for a method 300 of calendar-based predicted usage. The method starts at step 310. At step 320, the battery level and charging status for a device is determined. At step 330, the battery level and status is compared with predicted usage, wherein the predicted usage is based, at least in part, on a user's calendar. It should be appreciated that while we use the term calendar based prediction, past usage patterns may be utilized, alone or in conjunction with calendar items, to make such usage prediction. At step 335, it is determined whether the predicted usage is likely to exceed the remaining battery power prior to the anticipated next charge. If no, then at step 340, the device is used and charged, and the method begins again for the next period of battery use at step 310. However, if the predicted usage is likely (in some aspects to within a threshold probability) to exceed the remaining battery power, then at step 350, options are provided to the user to reduce battery usage and/or transfer one or more tasks to another device. In some embodiments, an alert may be transmitted to the user via the subject device and/or one or more other devices.

For example, if a user's calendar shows that the user is scheduled to be on a 12 hour international flight, the predicted power requirements for the user's devices are significantly different than they would be if the user is scheduled to be driving to various meetings over a 12 hour work day. In the former case, the requirements for cellular device power are reduced, while the requirements for laptop power may be high (in the event the user will not have a seat near a power outlet) or low (if the user will be seated near a power outlet). In the latter case, the requirements for cellular power may be high (unless the user charges the cellular device in the vehicle between meetings). In any case, as a result of recording connected devices in the Internet of Things, the device will inform the user of the availability of the power source, so that the user does not have to look for it. Indeed, the ability of available outlets to deliver charge (e.g., maximum watt hours that the outlet can support, amperage for a USB charger, etc.), and the times during which charge may be delivered (e.g. not during takeoff or landing) may be incorporated.

Predicted power requirements and other elements herein may be better predicted utilizing data gathered over a network. For example, in determining how much charge is required for an airplane trip, the system may search airplane configuration data (such as that available on the website http://seatguru.com) and/or may analyze ticket information in order to determine proximity to a charging outlet.

In one aspect, calendar-based charging may utilize worst case scenarios to predict power requirements. Thus, in the example of the 12 hour international flight, if the user's laptop is not being charged the night before, the user would receive a warning. In another aspect, the system may utilize additional information (such as past history or other factors, such as whether the user will be seated near a power outlet) to assess a probability that the user will run out of power prematurely. Based on the assessed probability, a warning may be issued if a device is not being charged.

Embodiments of the present invention may manage a user's power and resource usage continuously over the course of a day, and from day to day. In some aspects, based on manual input, past history, information available through the Internet, etc., the system may know where and when (and how many) electrical outlets and/or charging capacity of available power sources are available (e.g., at a Starbucks® that is in proximity to a meeting location, at the meeting locations, on certain air flights, in the lounge, in the seating area for the flight, etc.), or that another meeting attendee always carries a charger (e.g., an Apple iPhone "lightning" charger) with him in his briefcase to meetings. Thus, embodiments of the present invention may inform a user not to be concerned if, for example, his laptop is running low on battery power, because power outlets for charging will be available on the flight, at the meeting location, etc., and the user will have sufficient time to charge the laptop prior to a scheduled presentation requiring a certain level of charge, and then recharge the laptop for a further meeting late in the day. Similarly, aspects of the present invention will alert the user of potential problems with accessing power for charging. For example, aspects of the system may notify a user that charging his cellphone for 40 minutes in the car on his way to his first meeting will not be adequate for the anticipated uses throughout the day before another power source is available, unless the user charges his cellphone for at least an hour before he leaves home for the first meeting. An alert may also be provided to remind the user to charge the phone.

It is anticipated that in the future, apparatuses and systems may be available wherein a device may be automatically charged, for example, by robotic devices or systems capable of plugging in devices without human input or assistance and/or inductive or other remote charging capabilities. Such systems may, for example, plug in a user's car outside, without human interface or intervention. Aspects of the present invention are anticipated to interface with such apparatuses and systems, and provide the required control or electrical signal and/or instructions to activate such apparatuses and/or systems.

Calendar-based charging may also warn a user to discontinue device usage in order to preserve battery for one or more predicted requirements. For example, imagine a user who has a laptop with a 4 hour battery life. The user is scheduled to be a passenger for the three hour drive to the meeting, and then to make a 90 minute presentation. After a certain amount of laptop usage during the drive (for example, 2 hours), the user may be warned that the presentation time is scheduled for 90 minutes, and there are only 120 minutes of charge remaining.

Where multiple devices are capable of performing a task, the devices may communicate with regard to calendar-based charging and/or predictive charging. If Device 1 and Device 2 are both capable of accomplishing Task A (a task, for example, that must be performed during a meeting calendared for later that day), and a user is utilizing Device 1, the devices may communicate and permit the user to continue to perform other tasks on Device 1 (and/or not warn the user and/or ask the user for confirmation) so long as Device 2 retains enough power to perform other scheduled tasks as well as Task A. In a case where a task must be (or is preferably) performed by a single device, the devices may communicate to ensure that at least one device will retain sufficient charge to perform said task. In a case where the task may be performed in parts by different devices (for example, an iPad and an iPhone with comparable camera capability may split the task of taking photographs of a subject), the devices may coordinate to make sure that the devices capable of performing the task will have, in the aggregate at the time the task must be accomplished, sufficient power to perform the task. In one aspect, the devices may transfer data between themselves so that they have the appropriate data to accomplish the task before the system determines that both devices are capable of performing the task.

While it is useful to automate certain tasks, it is also desirable to apprise the user of available power in a manner that can be easily understood in the context of the device. For many users and in many situations, the way power is measured or described by devices is not helpful. For example, a person who is on a four hour flight and then scheduled to drive directly to a presentation does not need to know what percentage of battery life remains on the laptop; rather, the person needs to know whether she can continue to use the laptop to edit documents and listen to music on the airplane without putting her ability to do the presentation in jeopardy. Because different tasks may drain a battery at different rates, even a measurement that says "you have N minutes of battery life left" is not useful.

In one aspect, a power management mechanism is utilized whereby a user manually enters tasks to be performed on the current charge, where a calendar-based analysis is done to determine tasks to be performed on the current charge, or a combination thereof is utilized. Current charge status is compared to the tasks to be done on the current charge and a calculation is done to determine the likelihood that the tasks may be accomplished before the charge is depleted (leaving, optionally, some amount of charge for contingencies).

Figure 4:
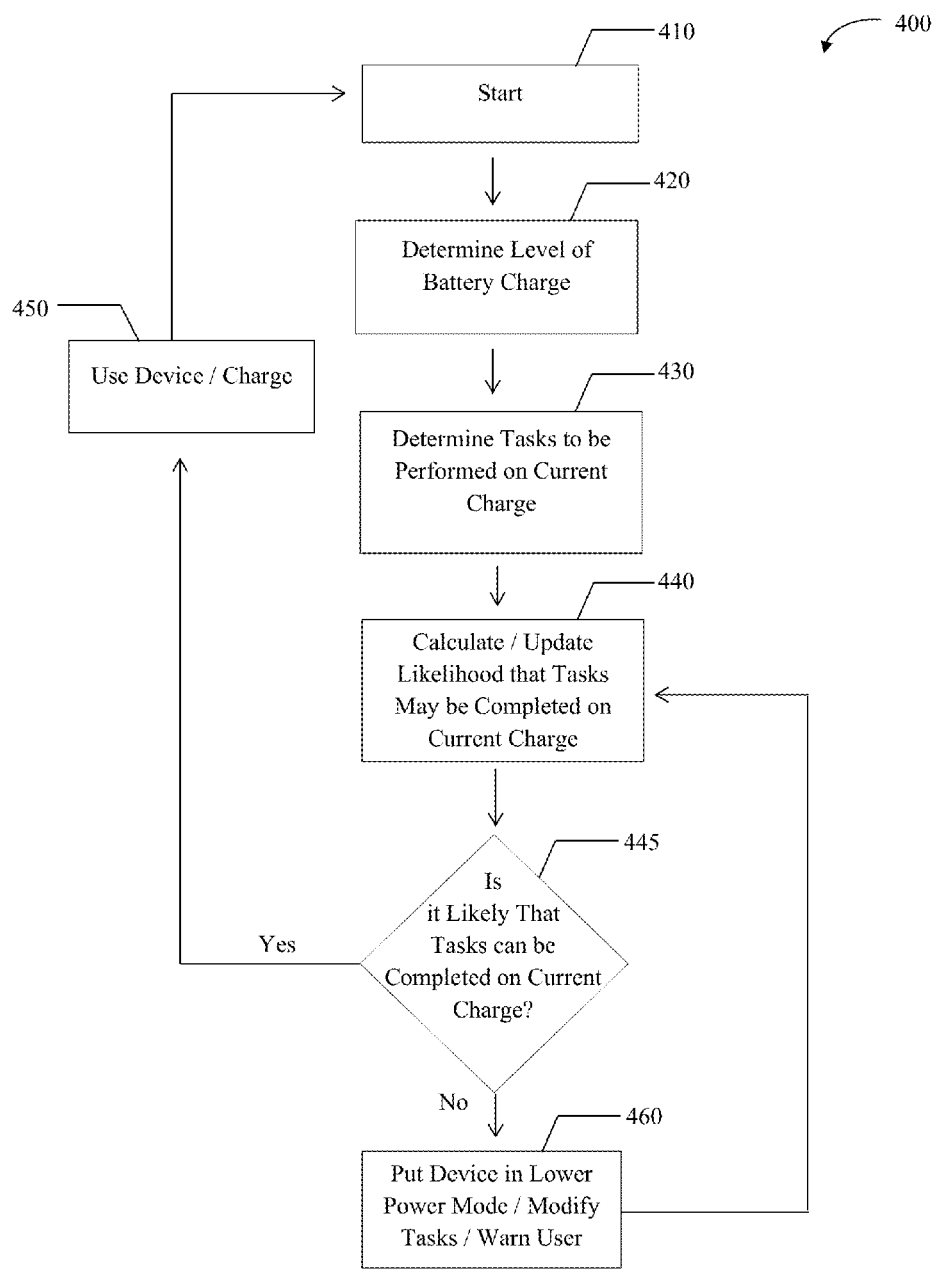
FIG. 4 is a flow chart for a method of managing device power, according to an embodiment of the present invention.

A method 400 describing such power management mechanism is shown in the flow chart of FIG. 4. The method starts at 410. At step 420, the level of battery charge is determined. At step 430, the tasks to be performed on the current charge are determined (e.g., by manual input and/or a calendar-based analysis). At step 440, the likelihood that the tasks to be performed may be completed on the current charge is calculated, and at step 445 it is determined if it is likely (e.g., to within a threshold likelihood) that the tasks can be completed on the current charge. If it is likely the tasks can be completed, then at step 450, the device is used and then recharged, and the method begins again for the next period of use. However, if it is not likely, at step 460 the user may be warned, the device may be put (either manually or automatically) in a lower power mode and/or tasks may be modified, performed based on priorities and/or transferred to other devices. As tasks are performed, time passes, and/or other changes take place that impact or reflect charge level, the calculation (step 440) may be updated. If the threshold likelihood that the charge will not support the desired activities is still exceeded, the user may be given an additional warning, the device temporarily powered off (either manually or automatically), the proposed list of uses for the remainder of the charge modified, and/or other steps taken to preserve the remaining charge for necessary tasks.

In one aspect, tasks may be prioritized. Tasks lowest on the priority list would be disallowed as the charge becomes too depleted to perform those tasks as well as higher ranked ones. In another aspect, some tasks may be given "protected" status, and the device may reserve a sufficient amount of charge to perform the one or more protected tasks. In one implementation, this may manifest as a simulation of a lower capacity battery whereby one or more of the user, the BIOS, the operating system, application software or other software or hardware elements are presented with data indicating that (a) the battery capacity is lower than the true capacity and/or (b) the current charge level is lower than the true charge level. One of the benefits of such a simulation is that other power management measures may be taken in order to preserve maximum usable time while still preserving sufficient charge for the protected tasks.

Figure 5:
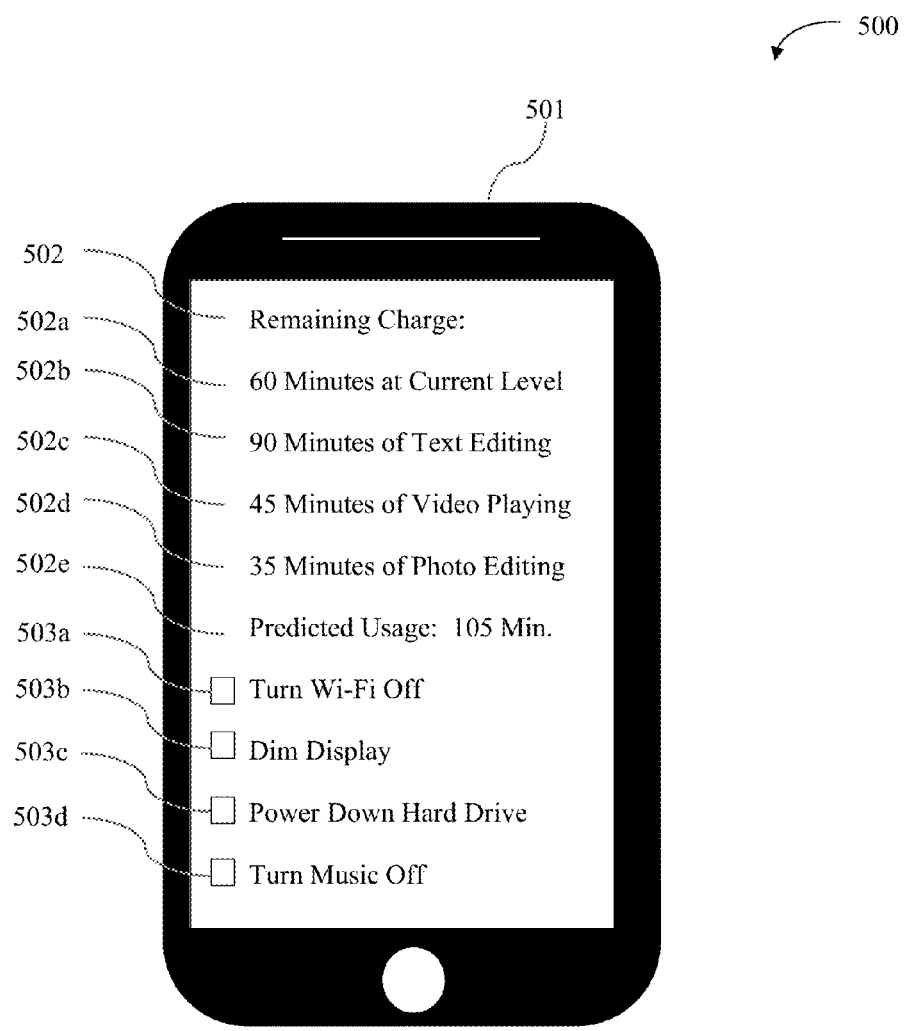
FIG. 5 shows a display of remaining minutes of charge for various tasks, predicted usage and options for reducing power consumption, according to an embodiment of the present invention.

In one implementation, a display may be presented to a user that shows remaining charge measured in tasks. Such display is graphically represented in the display 500 of the cellphone 501 of FIG. 5. For example, a pop-up menu may appear when a user clicks on a battery icon. As an example, the list may indicate: remaining charge 502: 60 minutes at current level 502*a*; 90 minutes of text editing 502*b*; 45 minutes of video playing 502*c*; and 35 minutes of photo editing 502*d*. In addition, the predicted usage 502*e* to complete calendar-based tasks (e.g., 105 minutes) may be displayed In one aspect, check boxes or other switches may be presented that, when actuated, change certain parameters used in the calculation of the list of tasks possible using the remaining charge. For example, the user may be able to see what happens if Wi-Fi is turned off 503*a*; if the display is dimmed 503*b*; if the mechanical hard drive is spun down 503*c*; and/or if the user stops playing music in the background 503*d*. This list is not exhaustive, and other check boxes or options may be presented to the user to enable the user to preserve the remaining charge for necessary and/or priority tasks.

In one aspect, a user may configure a device to have a plurality of virtual batteries. Such a device would have N physical batteries, and the capacities of those batteries used to calculate the overall charge available, C. In the case where N equals one, the capacity would be the capacity of the single physical battery. In the case where a user has a backup battery not installed and/or will add charge during the day, C may be calculated to include some or all of the charge available via those pathways. Different virtual batteries may then be created, one or more reserved for a specific use. The configuration of virtual batteries is particularly advantageous for cameras, including but not limited to pocket, video and SLR cameras. In one aspect, multiple device batteries, which need not necessarily be rechargeable, can be aggregated into a single logical battery which is then divided into multiple virtual batteries. For example, if my camera takes 2 AA batteries and lasts 100 photos on those batteries and I have a total of 6 AA batteries, if I know I need to take 150 photos at the end of the day, the device may create a single logical battery capable of 300 photos, and divide this into 2 virtual batteries, each capable of 150 images. In such a case, in one aspect the logical battery may require the user to change batteries manually. Using the foregoing example of the camera, the logical battery consists of 6 AA batteries, which means that the user is expected to change batteries twice in order to make the logical battery function with the expected charge amount.

Returning to the example of the user with a 240 minute physical battery and a scheduled 90 minute presentation, 100 minutes worth of power (to provide for a margin of error) may be allocated to virtual battery "A". If the user needs to write a proposal that will take 30 minutes, an additional 40 minutes of battery power may be allocated to virtual battery "B". The remaining 100 minutes of power may be allocated to virtual battery "C". The user then may start to utilize the device for a different purpose, and therefore runs on virtual battery "C". As the charge in "C" starts to reach certain thresholds, power management techniques implemented by the bios, operating system, or other means may be initiated.

For example, when 20% is left, the screen may dim. When 5% is left, the device may automatically hibernate. In one aspect, the automatic hibernation or sleep threshold may be lower for a virtual battery where actual additional charge remains in the physical battery (as the hibernation or sleep normally triggers at a level that leaves sufficient reserve to allow for a margin of error). The margin of error may be shared between virtual batteries, so that, for example a 10 minute margin of error may be presented for use with the "B" virtual battery, but when that margin of error is not used (and/or if some of the principal amount of battery power is not used), so that when event "B" is over, the additional charge may be applied to one or more of the additional virtual batteries. Such reallocation of charge may be presented to the operating system as a simulated charging event. In some aspects, the active virtual battery may be selected upon powering on the device, awakening the device from a sleep mode, by inputting the identity of the virtual battery from within an operating system, by switching the virtual battery over a wide area, local, or near field connection, and/or by actuating a physical switch.

Figure 6:
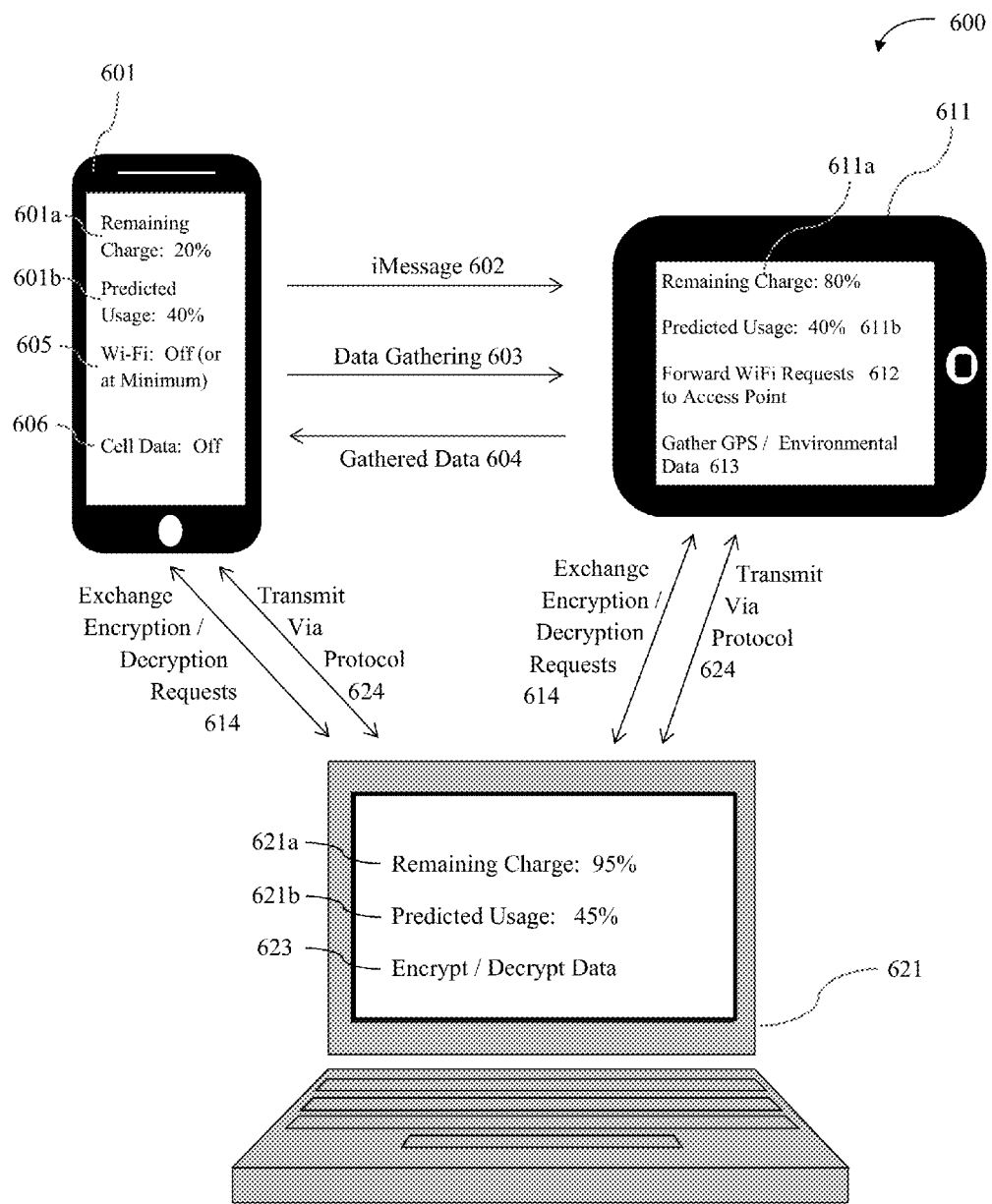
FIG. 6 schematically illustrates the transfer of tasks based on power resources of various devices, according to an embodiment of the present invention.

It is common for users to have multiple devices, and frequently those devices have different power levels, battery capacity, charge rates, and energy usage rates. In one aspect, devices may exchange and/or transfer data and/or tasks in order to better manage resources or power. A graphical illustration of this exchange is shown in the system 600 of FIG. 6. For example, a user may have an iPhone 601, an iPad 611, and a MacBook Air 621. All three of the devices 601, 611, 621 are capable of communicating utilizing Apple's iMessage service, and messages sent to or from one of the devices 601, 611, 621 appear on all of the devices 601, 611, 621 (provided they are associated with the same account). If the user's iPad 611 has a remaining charge 611*a* of 80%, but a predicted usage 611*b* of only 40% is needed to complete planned tasks based on predictive charging, the IPad 611 may be available to take on additional tasks. However, if, on the other hand iPhone 601 has a remaining iPhone charge 601*a* of only 20%, but the iPhone predicted usage 601*b* to complete planned tasks based on predictive charging is 40%, the devices 601, 611 may negotiate an exchange whereby the resources dedicated to, for example, iMessage 602 on the iPhone 601 are reduced or terminated so long as the iPad 611 is able to take over the iMessage 602 functions.

In one implementation, a reduced resource set is utilized to coordinate communications between devices. For example, Wi-Fi 605 and cellular data 606 connections on the iPhone 601 may be turned off (or set to minimum levels) and the iPhone 601 may instruct the iPad 611 to perform data gathering 603, as requested by the operating system and/or applications, and to transfer gathered data 604 either continuously or at intervals via a protocol, for example Bluetooth. When transferring at intervals, the Wi-Fi may be re-enabled for the transfer.

In another implementation, overall power usage may be reduced by dividing certain tasks between proximate (or even non-proximate) devices. For example, Device A may gather GPS data; Device B may connect to the voice and SMS network; Device C may connect to the data network; and all of the devices may share those connections.

In another aspect, the higher power level device may be utilized in a manner crudely analogous to a repeater or signal amplifier. Returning to the iPhone example of FIG. 6, the iPhone 601 may reduce its Wi-Fi power 605 to the minimum necessary to maintain a reliable connection (or to establish an intermittent connection) to the iPad 611. By reducing transmission power, the device's power utilization rate is reduced. The iPad 611, in turn, would forward the Wi-Fi requests 612 on via a higher power signal to the Wi-Fi access point. Similarly, GPS and other environmental data 613 may be gathered from the iPad 611, allowing gathering of the corresponding data 606 on the iPhone 601 to be discontinued. In one aspect, devices sharing tasks in this manner may imitate each other, such as by exchanging network addresses (e.g., MAC addresses or other network addresses or identifiers; not shown) so that other network devices would not be able to determine that the devices 601, 611, 621 are utilizing shared resources and/or that one device 601, 611 or 621 has taken over tasks for the other.

In another aspect, groups of devices may divide or share tasks even without requiring a previous relationship between the devices. For example, if there are ten people in a meeting and each carries a cellular phone, it is wasteful for each device to gather GPS data. The devices may take turns providing GPS data, GPS data may be provided by the device with the highest charge level, or another means of determining which device or devices provide GPS data may be used. In another aspect, the device with the highest quality signal and/or the lowest required power to utilize the signal may be selected. To prevent a single device from transmitting false data, a plurality of devices may be utilized, and the data may be required to be similar to within a set margin prior to being utilized. The data may be shared over a low power connection (or other connection) constantly, at intervals, or a single time between movement events.

In another aspect, an accelerometer, GPS or similar motion or attitude change detection mechanism may be utilized to determine if the device has moved. For certain battery-intensive tasks, such as attempting to find a cellular signal, the task may be done a certain number of times (e.g. once) before being suspended. The task may be reactivated upon movement of the device. Similarly, the task may be launched at a set interval, which interval may be longer if the device has not moved. With regard to GPS or other geolocation, such tasks may be suspended during a time when the device is stationary, as measured by an accelerometer, motion or attitude change detection mechanisms.

Referring again to FIG. 6, tasks related to communications, such as encryption and decryption of data streams, may optionally be delegated to the device (e.g., MacBook Air 621) with a higher charge level 621*a* (or the device identified based on other criteria). Thus, for example, a connection to a secure ("HTTPS") web site by the iPad 611 may be made by the MacBook Air 621, allowing the MacBook Air 621 to do the computationally expensive encryption and decryption 623. This may be accomplished by exchanging encryption/decryption requests 614, actually rendering the pages (not shown) on the MacBook Air 621 and transmitting them via a protocol 624 (e.g., similar to VNC or RDP), utilizing a proxy server, or otherwise.

In another aspect, computationally intense and/or power intense tasks may be offloaded to a different device and the results returned via a network or other connection. The connection speed may be utilized to determine which tasks are appropriate to offload. For example, on a local area network with a 2 ms latency time, calculations for game play may be offloaded to a desktop computer in order to speed processing and/or save energy on the portable device. On a local area network with a 20 ms latency time, game play may be impaired, but image editing calculations may be offloaded to the desktop computer. Where speed is the key consideration, the calculations may be done simultaneously on both devices, and the results from device which finishes first may be used.

In one aspect (not shown in the drawing FIGS.), devices can trade off tasks in order to conserve power. For example, an iPad may have 90% charge and an iPhone 10%. As a user setting or a default setting, when the charge level drops below a certain threshold, the iPhone may transfer all tasks the iPad can perform (for example, the iPad takes over as the alarm clock and network traffic device) and the iPhone turns off or enters a lower power state. In one aspect, the lower power device may be powered off and powered on by the higher power device (the powering off would stop short of zero power utilization to the extent necessary to keep the device able to receive a power-up signal).

Figure 7:
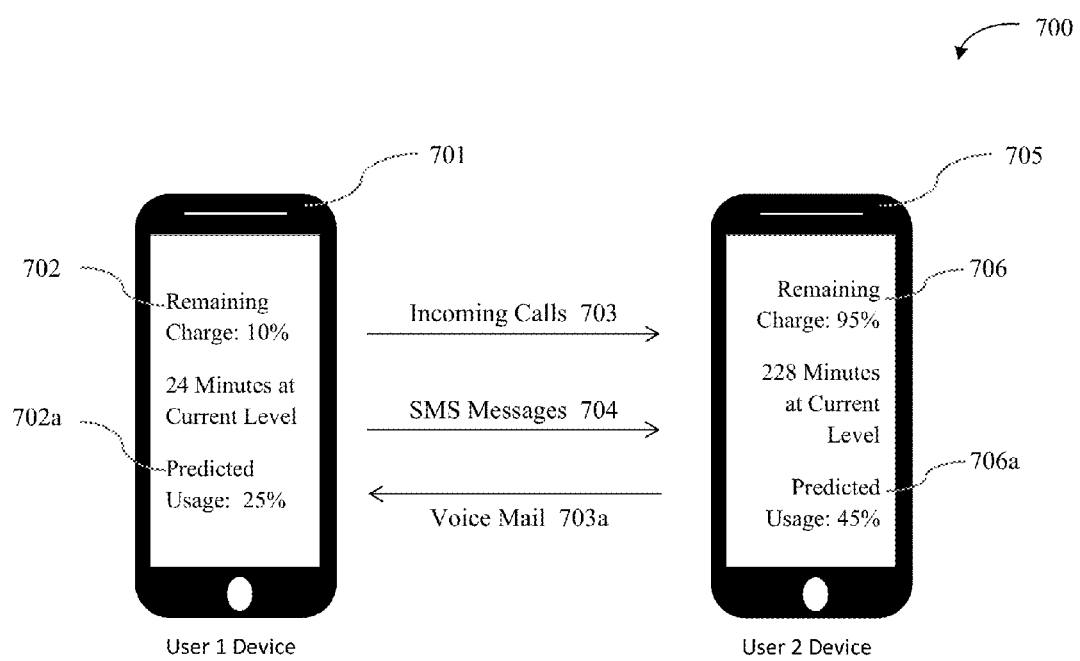
FIG. 7 schematically illustrates the transfer of calls, messages and voice mail between two cellular phones, according to an embodiment of the present invention.

In one aspect, multiple phones may be combined on a single line in order to preserve power. This aspect is graphically illustrated in the system 700 of FIG. 7. For example, if Example Co. has two employees, Jill and Jane, who are at a meeting and Jill's phone (User 1 Device) 701 is about to run out of power (e.g., device 701 has a remaining charge 702*a* of 10%; 24 minutes at current level), but device 701's predicted usage 702*b* is 25%, the incoming calls 703 to Jill's phone may be routed to Jane's phone (User 2 Device) 705, which, for example, has a remaining charge 706*a* of 95% (228 minutes at current level), and a predicted usage 706*b* of only 45%. In one aspect, if the incoming calls 703 that are routed to Jane's phone are not answered, they would be re-routed to the voicemail 703*a* of Jill's phone 701. Similarly, SMS messages 704 or other messages may also be routed in this manner.

In one implementation, messages or other data may be encoded in a manner that requires Jill to enter a password in order to access that data so that Jane, despite receiving the data on her device 705, cannot access it. A code may also be required to answer incoming calls intended for Jill but that are routed to Jane's phone 705. In one implementation, the re-routing may take place automatically based on proximity of the devices and the relationship between the devices 701, 705 and/or the device owners and/or permission given by the device owners. For example, a husband and wife may configure their devices so that calls to either of them automatically go to the other's phone when the phones are proximate and one is low on batteries (or when the phones were proximate at the time one of them ran out of batteries). In one aspect, the rerouting may be altered by accessing a networked control system, such as one run with a web server as a front end.

In some embodiments, devices may share a single data (voice, SMS, GPS and/or other) connection so the phone with the most battery power is the only one with at least one category of live connection, and other phones may connect to that device, and thereby communicate via that device over that at least one category of live connection, via (in some implementations lower power) Bluetooth, near field, peer to peer Wi-Fi, and/or other connection modality.

In some aspects, a single charger outlet may charge devices in sequence. For example, if there is a single USB outlet, a splitter may allow connection to N devices, and then charge the devices in sequence, or charge to N % each or to an arbitrarily set percentage that may differ by device. Then the next device may be charged, and then go back to the first device to complete the charge after the last device is partially charged, etc.

Embodiments of the present invention may also charge to the needed level optionally plus N % margin of error before charging next device. When charging from a portable battery, the devices, systems and methods of the present invention may intelligently divide a charge between connected devices (e.g., a device with 100 units of charge attached to 4 phones needing 50 units each might charge each of the 4 phones with 25 units and/or might charge each to a set amount which can differ by device, etc.) In another aspect, charge may be directed to the device most capable of taking the charge at a full rate of charging. For example, the Tesla Model S is capable of charging remarkably rapidly when the battery is nearly empty, but charges remarkably slowly when the battery is nearly full. A single outlet equipped with an aspect of the invention may send charge first to the vehicle with the lowest battery state, and then switch to a second vehicle when the charge rate on the first vehicle drops. In one aspect, the charge is sent when the first vehicle's charge rate drops below the charge rate the second vehicle is capable of. As the second vehicle charges, and as that charge rate drops, charge may be redirected to the first vehicle. In one aspect, charging may be alternated between devices based on battery condition and/or temperature. In another aspect, power may flow to more than one device simultaneously. Where power is flowing to more than one device simultaneously, in another aspect the amount of power provided to each device may be managed based on battery condition and/or temperature.

In another aspect, there is sometimes a need to charge more than one device over a single circuit with a limited amount of amperage. For example, if there is 110 volt, 12 amp circuit and the user wants to charge an electric lawnmower (3 amps), and electric car (10 amps), a laptop (1 amp) and a tablet (1 amp), manual and/or formulaic control systems may be utilized to direct charge to the devices in a manner than remains under the 12 amp maximum. For example, if charging the electric vehicle to a total charge of 40 kWh is required for the next day's driving needs, the vehicle may be charged together with the laptop and tablet for a total of 12 amps. When the car has completed charging, the laptop and tablet may be charged simultaneously with the lawn mower.

In some instances, power may be exchanged between devices and a charge to an account made or credited as a result. In one aspect, the charge or credit may reflect a financial value, but regardless of whether financial value is reflected, may also reflect a participation credit. In one aspect, unless a person participates in sharing charge or device capabilities by providing charge or device capabilities to others, that person may be disallowed from obtaining charge or device capabilities from others absent a payment or other compensation.

Charging and/or charge status of multiple devices may be displayed to a user via a single interface. For example, a charge gauge may be presented on a user's phone that displays charge status for the phone, the user's tablet, and the user's laptop computer. In some implementations, charge status may be displayed in terms of capability and the user given the option of moving tasks between devices in order to preserve sufficient charge on one or more devices for one or more tasks. For example, if a user with two devices—a personal phone and a business phone—needs to receive email all day, the user may transfer all tasks and inbound calls from the business phone to the personal phone and transfer all data checking from the personal phone to the business phone. Such splitting may be done based on automated algorithms, manually, or a combination. By splitting tasks between devices, the user is able to avoid having multiple devices using power to perform tasks that are more efficiently performed on a single device. For example, by moving all data services from the personal phone to the business phone, the data services transmission and receiver components may be powered down on the personal phone.

In another aspect, the system may detect and warn when a device is utilizing power in an unexpected manner. For example, it is a relatively common experience for users to instruct their laptop computer to shut down only to have an errant application refuse to quit (for example, displaying the message "save document first" and interrupting the shutdown process while awaiting a response). In situations where the user cannot or does not wait to confirm a full shutdown before folding the laptop and putting it in a bag, the laptop may continue to drain power. Similarly, an application may utilize an abnormal amount of power (such as a processor-intensive program). It is also common for malware to utilize a device in a manner that interferes with power management, such as preventing a device from "sleeping".

In one aspect, the system may be integrated with antivirus software or services to trigger a warning and/or response when power usage consistent with malware is detected.

Likewise, when a device is utilizing power in an unexpected manner, an appropriate warning or alert may be triggered.

In one aspect, a single application may display charge status and other information for multiple devices. Considering the display 800 of FIG. 8, one implementation may contain fields indicating whether a device is in use 801a-809a, the device name 801b-809b, a graphic depiction of charge status 801c-809c, a percentage of charge remaining 801d-809d, an indication of whether the device is on a battery or electrical outlet 801e-809e, a pull-down menu for more information 801f-809f, and the current usage amount 801g-809g. Abnormal usage may be indicated (e.g., 802h). Similarly, power requirements for known or predicted future needs may be displayed (e.g., a warning that a device must be charged for a presentation 806i). Information related to additional devices (e.g., an electric car, one or more power tools, house battery may be accessed through a "MORE" button 810. Additionally, the "MORE" button may also include other user's devices (with the proper permissions).

In one aspect, the power management system may be fully or partially integrated into a battery, optionally including data transmission and/or receiving capability. The battery-integrated device may then determine usage patterns for the device it is located in (e.g., it takes N minutes to charge from empty and it takes Y minutes to discharge in normal usage). Alternatively (or in addition), data may be provided to the system (for example, the type of device and/or its power characteristics). In some aspects, the power profile gleaned from the device may be utilized to determine the likely device type by reference to a database of power profiles and associated devices. Utilizing a battery-integrated system allows integration of the benefits of the system to existing devices and allows the system to be implemented on devices where regulatory issues or standards-compliance issues may otherwise prevent or delay deployment.

In some aspects, flash memory and other storage capacity issues may also be managed utilizing this system. For example, if a user of a camera with 16 GB of built-in memory has used all but 1 GB and the camera typically takes shots that are 10 megabytes, the user has the ability to take only 100 pictures before running out of storage. If the battery can take 100 pictures before depletion starting at 20% charge, the constraining factor with a fully charged battery is the flash memory and not power availability. In such a case, it may be desirable to display to the user the constraining factor and/or both battery and flash memory constraints.

As flash memory is depleted, the user may be warned to transfer data out of flash memory or to obtain an additional amount of flash memory. In one aspect, charging may be utilized to forecast the amount of flash memory required. For example, if a user begins charging a video camera that can record 10 GB of data on a full charge, but the video camera has only 5 GB of free space, the user may receive a warning when the charge level approaches 50%, indicating that additional charging will no longer increase use time without also removing the other constraining factor.

In one aspect, such charge management may be useful in limiting power costs. In another, it may be useful in allocating a limited amount of charge among various devices. For example, if a safari tour guide brings a large battery on a safari for charging camera batteries for the cameras of the tourists, to prevent full depletion of the charge in the large battery, the amount of power distributed to any given tourist camera battery may be limited to some amount relative to the power required to fill the flash memory. For example, if Joe's camera normally utilizes 50% of a charge in order to fill 1 GB and Joe's camera has only 1 GB of storage, the large battery may discontinue transfer of power to Joe's camera battery when that battery reaches 50% charge. Because power usage relative to memory usage may vary with the habits of the user, the user's history and/or the device's history may be utilized to refine the predictive charge cut-off level.

In another aspect, transfer payments may be made to compensate for power transfer, power savings, or to incentivize participation in a power sharing or power reduction effort. For example, if two owners of electric vehicles, EV1 and EV2, meet in a parking lot and EV1 is nearly depleted while EV2 is full, the vehicles may be connected and power transferred from EV2 to EV1. In one aspect, the power transfer is measured and automatically triggers a transfer of credits, funds, or other means of exchange.

In another aspect, a standardized display may be provided (standardized in terms of appearance and/or in terms of the type of data provided) to show overall power status for a plurality of items. Such items may be connected devices (such as portable phones) or even "old school" devices such as power tools. For devices incapable of measuring their own charge status, a battery with such capabilities, coupled with the ability to transmit status (which may take the form of a battery, a charging device, or a combination) may be utilized.

The foregoing descriptions of specific embodiments of the present invention have been presented for purposes of illustration and description. They are not intended to be exhaustive or to limit the invention to the precise forms disclosed. Obviously, many modifications and variations are possible in light of the above teaching. The embodiments were chosen and described in order to best explain the principals of the invention and its practical application, to thereby enable others skilled in the art to best utilize the invention and the various embodiments and modifications as are suited to the particular use contemplated. It is intended that the scope of the invention be defined by the components and elements described herein and their equivalents.

What is claimed is:

1. An apparatus, comprising:
a portable device comprising a processor, a memory, and a battery, wherein the memory holds instructions that, when executed by the processor, cause the device to:
determine when power delivery to the device is interrupted;
determine if a human has removed one of a charger operably connected to the device and a power source of the device, where determining is accomplished by measuring electrical changes associated with human skin coming into contact with the one of the charger and the power source; and
if the determining indicates that a human has not removed the one of the charger or the power source, substantially concurrently with the interruption of power, triggering an alert.

2. The apparatus of claim 1, wherein the memory holds further instructions for suppressing the alert based on a determination that the existing charge level of the device exceeds a threshold.

3. The apparatus of claim 1, wherein the alert is sent to a plurality of devices.

4. The apparatus of claim 3, wherein the alert is simultaneously displayed on the plurality of devices.

5. The apparatus of claim 3, wherein the alert is displayed in a sequence beginning with the portable device and rotating through each of the plurality of devices in turn, until a user of the portable device acknowledges the alert.

6. The apparatus of claim 3, wherein the alert is sent to each of the plurality of devices in a sequence based on a priority order of devices based at least in part on how recently each of the devices was used.

7. The apparatus of claim 3, wherein the alert is sent to a second portable device associated with an account not controlled by a user of the portable device.

* * * * *